US011600303B1

(12) United States Patent
Hay et al.

(10) Patent No.: US 11,600,303 B1
(45) Date of Patent: *Mar. 7, 2023

(54) ENHANCED VISUALIZATION TECHNIQUES USING RECONSTRUCTED TIME WAVEFORMS

(71) Applicant: RDI TECHNOLOGIES, INC., Knoxville, TN (US)

(72) Inventors: Jeffrey R. Hay, Prospect, KY (US); Mark William Slemp, Tellico Plains, TN (US); Kenneth Ralph Piety, Knoxville, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,840

(22) Filed: Apr. 29, 2022

Related U.S. Application Data

(63) Continuation of application No. 17/483,975, filed on Sep. 24, 2021, now Pat. No. 11,322,182.

(60) Provisional application No. 63/084,073, filed on Sep. 28, 2020.

(51) Int. Cl.
*G11B 27/036* (2006.01)
*H04N 5/77* (2006.01)

(52) U.S. Cl.
CPC ............ *G11B 27/036* (2013.01); *H04N 5/77* (2013.01)

(58) Field of Classification Search
CPC .................................. G11B 27/036; H04N 5/77
See application file for complete search history.

(56) References Cited

U.S. PATENT DOCUMENTS

| | | | |
|---|---|---|---|
| 5,517,251 | A | 5/1996 | Rector et al. |
| 5,666,157 | A | 9/1997 | Aviv |
| 6,028,626 | A | 2/2000 | Aviv |
| 6,295,383 | B1 | 9/2001 | Smitt et al. |
| 6,422,741 | B2 | 7/2002 | Murphy et al. |
| 6,456,296 | B1 | 9/2002 | Cataudella |
| 6,727,725 | B2 | 4/2004 | Devaney et al. |
| 6,774,601 | B2 | 8/2004 | Schwartz et al. |
| 6,792,811 | B2 | 9/2004 | Argento et al. |
| 7,622,715 | B2 | 11/2009 | Ignatowicz |
| 7,672,369 | B2 | 3/2010 | Garakani et al. |
| 7,710,280 | B2 | 5/2010 | McLellan |
| 7,862,188 | B2 | 1/2011 | Luty et al. |

(Continued)

OTHER PUBLICATIONS

Hay, J.R. High Dynamic Range Imaging for the Detection of Motion\ pp. 18-141; dissertation University of Louisville (Kentucky); May 2011.

(Continued)

*Primary Examiner* — Girumsew Wendmagegn
(74) *Attorney, Agent, or Firm* — Wyatt, Tarrant & Combs, LLP; Stephen C. Hall

(57) ABSTRACT

A source video of a scene showing moving objects, undergoing periodic motion in a field of view which may be located in a region of interest, is filtered and processed by constructing a representation such as a frequency spectrum plot of some of the frequencies of motion in the scene or region of interest and enabling a selection of frequency peaks representing one or more pixels in the field of view from which to generate reconstructed waveforms, then applying the reconstructed waveform at each pixel to a reference frame to produce a modified video recording.

12 Claims, 10 Drawing Sheets

(56) References Cited

U.S. PATENT DOCUMENTS

| | | | |
|---|---|---|---|
| 7,903,156 B2 | 3/2011 | Nobori et al. |
| 8,119,986 B1 | 2/2012 | Garvey, III et al. |
| 8,149,273 B2 | 4/2012 | Liu et al. |
| 8,170,109 B2 | 5/2012 | Gaude et al. |
| 8,242,445 B1 | 8/2012 | Scanlon et al. |
| 8,351,571 B2 | 1/2013 | Brinks et al. |
| 8,374,498 B2 | 2/2013 | Pastore |
| 8,475,390 B2 | 7/2013 | Heaton et al. |
| 8,483,456 B2 | 7/2013 | Nagatsuka et al. |
| 8,502,821 B2 | 8/2013 | Louise et al. |
| 8,515,711 B2 | 8/2013 | Mitchell et al. |
| 8,523,674 B2 | 9/2013 | Patti |
| 8,537,203 B2 | 9/2013 | Seibel et al. |
| 8,693,735 B2 | 4/2014 | Kielkopf et al. |
| 8,720,781 B2 | 5/2014 | Wang et al. |
| 8,731,241 B2 | 5/2014 | Johnson et al. |
| 8,765,121 B2 | 7/2014 | Maslowski et al. |
| 8,774,280 B2 | 7/2014 | Tourapis et al. |
| 8,797,439 B1 | 8/2014 | Coley et al. |
| 8,803,977 B2 | 8/2014 | Uchima et al. |
| 8,811,708 B2 | 8/2014 | Fischer et al. |
| 8,823,813 B2 | 9/2014 | Manzel et al. |
| 8,831,370 B2 | 9/2014 | Archer |
| 8,874,374 B2 | 10/2014 | Bogucki |
| 8,879,789 B1 | 11/2014 | Figov et al. |
| 8,879,894 B2 | 11/2014 | Neuman et al. |
| 8,884,741 B2 | 11/2014 | Cavallaro et al. |
| 8,897,491 B2 | 11/2014 | Ambrus et al. |
| 8,924,163 B2 | 12/2014 | Hudson et al. |
| 9,006,617 B2 | 4/2015 | Mullen |
| 9,075,136 B1 | 7/2015 | Joao |
| 9,805,475 B2 | 10/2017 | Rubinstein et al. |
| 10,598,568 B1 | 3/2020 | Morey et al. |
| 11,322,182 B1 * | 5/2022 | Hay .................. H04N 5/77 |
| 2004/0032924 A1 | 2/2004 | Judge, Jr. |
| 2004/0081369 A1 | 4/2004 | Gindele et al. |
| 2004/0160336 A1 | 8/2004 | Hoch et al. |
| 2004/0184529 A1 | 9/2004 | Henocq et al. |
| 2006/0009700 A1 | 1/2006 | Brumfield et al. |
| 2006/0049707 A1 | 3/2006 | Vuyyuru |
| 2006/0147116 A1 | 7/2006 | Le Clerc et al. |
| 2006/0251170 A1 | 11/2006 | Ali |
| 2007/0061043 A1 | 3/2007 | Ermakov et al. |
| 2007/0276270 A1 | 11/2007 | Tran |
| 2009/0010570 A1 | 1/2009 | Yamada et al. |
| 2010/0033579 A1 | 2/2010 | Yokohata et al. |
| 2010/0042000 A1 | 2/2010 | Schuhrke et al. |
| 2010/0091181 A1 | 4/2010 | Capps |
| 2010/0110100 A1 | 5/2010 | Anandasivam |
| 2010/0324423 A1 | 12/2010 | El-Aklouk et al. |
| 2010/0328352 A1 | 12/2010 | Shamier et al. |
| 2011/0019027 A1 | 1/2011 | Fujita et al. |
| 2011/0152729 A1 | 6/2011 | Oohashi et al. |
| 2012/0207218 A1 | 8/2012 | Asamura et al. |
| 2013/0060571 A1 | 3/2013 | Soemo et al. |
| 2013/0176424 A1 | 7/2013 | Weil |
| 2013/0201316 A1 | 8/2013 | Binder et al. |
| 2013/0342691 A1 | 12/2013 | Lewis et al. |
| 2014/0002667 A1 | 1/2014 | Cheben et al. |
| 2014/0072190 A1 | 3/2014 | Wu et al. |
| 2014/0072228 A1 | 3/2014 | Rubinstein et al. |
| 2014/0072229 A1 | 3/2014 | Wadhwa et al. |
| 2014/0112537 A1 | 4/2014 | Frank et al. |
| 2014/0169763 A1 | 6/2014 | Nayak et al. |
| 2014/0205175 A1 | 7/2014 | Tanaka et al. |
| 2014/0236036 A1 | 8/2014 | de Hann et al. |
| 2014/0341470 A1 | 11/2014 | Lee et al. |
| 2014/0368528 A1 | 12/2014 | Konnola |
| 2015/0134545 A1 | 5/2015 | Mann et al. |
| 2015/0221534 A1 | 8/2015 | van der Meulen |
| 2016/0171309 A1 | 6/2016 | Hay |
| 2016/0217587 A1 | 7/2016 | Hay |
| 2016/0217588 A1 | 7/2016 | Hay |
| 2016/0232686 A1 | 8/2016 | Park et al. |
| 2016/0300341 A1 | 10/2016 | Hay |
| 2017/0000356 A1 | 1/2017 | Smith, Sr. |
| 2017/0000392 A1 | 1/2017 | Smith |
| 2017/0119258 A1 | 5/2017 | Kotanko |
| 2017/0135626 A1 | 5/2017 | Singer |
| 2017/0221216 A1 | 8/2017 | Chen |
| 2018/0061063 A1 | 3/2018 | Buyukozturk |
| 2018/0177464 A1 | 6/2018 | DeBusschere |
| 2018/0225803 A1 | 8/2018 | Elgharib |
| 2018/0276823 A1 | 9/2018 | Barral |
| 2018/0296075 A1 | 10/2018 | Meglan |
| 2018/0335366 A1 | 11/2018 | Qiao et al. |
| 2019/0206068 A1 | 7/2019 | Stark et al. |
| 2020/0029891 A1 | 1/2020 | Swisher |
| 2020/0065957 A1 | 2/2020 | Hay |

OTHER PUBLICATIONS

Liu et al., "Motion magnification", ACM Transactions on Graphics (TOG)—Proceedings of ACM SIGGRAPH 2005 TOG Homepage, vol. 24 Issue 3, Jul. 2005.

Mazen, et al.; A vision-based approach for the direct measurement of displacements in vibrating systems; article from Smart Materials and Structures; 2003; 12: pp. 785-794; IOP Publishing LTD; UK.

Meyer S., Sorkine-Hornung A., Gross M. (2016) Phase-Based Modification Transfer for Video. In: Leibe B., Matas J., Sebe N., Welling M. (eds) Computer Vision—ECCV 2016, ECCV 2016, Lecture Notes in Computer Science, vol. 9907, Springer, Cham. (Year: 2016).

Miyatake K, Yamagishi M, Tanaka N, Uematsu M, Yamazaki N, Mine Y, Sano A, Hirama M. New method for evaluating left ventricular wall motion by color-coded tissue Doppler imaging: in vitro and in vivo studies. J Am Coll Cardiel. Mar. 1, 1995;25(3):717-24 (Year: 1995).

Nobuo Yamazaki et al "Analysis of Ventricular Wall Motion Using Color-Coded Tissue Doppler Imaging System" 1994 Jpn. J. Appl. Phys. 33 3141 (Year: 1994).

"Rubinstein et al. ("Revealing Invisible Changes in The World (YouTube)", YouTube https://www.youtube.com/watch?v=e9ASH81BJ2U, 2012".

"Wadhwa et al., "Phase-based Video Motion Processing". also see YouTube https://www.youtube.com/watch?v=W7ZQFG7Nvw, SIGGRAPH 2013".

Wu et al., "Eulerian Video Magnification for Revealing Subtle Changes in the World", ACM Transactions on Graphics (TOG)—Proceedings of ACM SIGGRAPH 2012 TOG Homepage, vol. 31 Issue 4, Jul. 2012, Article No. 65.

* cited by examiner

ENHANCED VISUALIZATION TECHNIQUES USING RECONSTRUCTED TIME WAVEFORMS

CROSS REFERENCE TO RELATED APPLICATIONS

This application claims the benefit of and priority to U.S. patent application Ser. No. 17/483,975, titled "Enhanced Visualization Techniques Using Reconstructed Time Waveforms" filed Sep. 24, 2021 and now patented as U.S. Pat. No. 11,322,182 having issued on May 3, 2022, and naming at least one of the present inventors, which claimed benefit of and priority to U.S. Provisional Application No. 63/084,073, which was filed on Sep. 28, 2020, the contents of all of which are fully incorporated herein by reference.

BACKGROUND

The measurement of dynamic motion from civil structures, machines, and living beings using video recordings from video acquisition devices has gained wide acceptance since 2010. The video acquisition devices, such as but not limited to one or more video cameras, webcams, or digital cameras integral in cell phones providing a source video, offer the advantages of being a non-contact sensor and provides information from millions of pixels simultaneously. In the visible light range, changes of the light intensity can be related to the motion of objects in the field of view. In this case, the fundamental unit of measurement is displacement, and the available accuracy is a tenth of a mil or less. The application of mathematical techniques to amplify motion to visually exaggerate the subtle motion of one or more objects in a frame and the ability to modify the frame rate on replay of the recorded video allows technicians to visually present the motion of concern and provides powerful arguments about what is happening and the need for repair to decision-makers who may have limited technical understanding of the underlying physics of the fault condition.

The use of video recordings to capture vibration characteristics of objects in the scene of view is extremely powerful because in addition to the quantitative measurement of the time waveform or frequency spectrum of the motion in the scene the analyst can visualize the motion of all the objects or structures in the scene. This visualization of the motion can be mathematically modified by amplifying or filtering the video and replaying the frequency(s) of interest at a speed that is optimized for observation by the human eye. This allows the analyst to present the specific motion of concern in a visually enhanced format that is easily understood by less technically skilled individuals.

There are several shortcomings associated with traditional filtering techniques when applied to video data. The duration of recording, the sampling rate limitation of conventional cameras, and data storage limitations create constraints that impact the visual quality of the mathematically modified video. Most conventional cameras provide sampling rates of less than 1000 Hz. The duration of the recording determines the lowest frequency that can be analyzed in the data and the frequency difference or resolution of the frequency spectrum. The traditional filtering techniques when applied to finite sets of data may produce distortions at the beginning and end of the data or enveloping throughout the data set which distorts the visual representation of the reconstructed motion. Although slightly greater than two samples per cycle is enough to mathematically identify a specific frequency at which an object or objects are moving using frequency analysis methods, when this data is filtered to create a waveform at that frequency a few samples per cycle does not provide a visual presentation of the motion that is easy to follow due to the small numbers of samples per cycle available. This will almost always occur when studying higher frequencies due to the limitations of the sampling rate of the camera. One approach for improving these visual effects is to capture data at extremely high rates for long durations and when processing to throw out data that is distorted. However, when capturing millions of pixels at high sampling rate for extended periods, the data storage requirements and computation times increase dramatically.

Accordingly, there is a need to isolate frequencies of interest in a video recording and present reconstructed videos which reduce noise and allow low or high frequencies to be visually observed with a reasonable number of samples per cycle and without distortion effects from the processing techniques. Frequency domain filtering techniques are known to produce distortion in the reconstructed time waveform if the frequency being filtered does not have an exact number of cycles in the sampled data set. Although distortion and other negative effects can be offset using a time domain reconstruction method, this approach can be very computationally intensive if the waveform is constructed from each frequency line present in the spectral data.

In view of such limitations, alternate filtering methods which overcome the limitations described above is needed and described in this application. Accordingly, time domain waveform reconstruction techniques, described herein according to multiple embodiments and alternatives, not only remove the distortion inherent in frequency domain filtering techniques, but such novel techniques offer the optional advantage of creating waveforms with a higher number of samples per period; and thus, reconstructing the video with a higher resolution than the originally collected video. Such novel techniques, as described herein, reduce the time associated with waveform reconstruction and reduce random noise in the recording. Such methods promote efficiency, for example when a user desires to filter a video depicting motion of objects or people to only one or a few frequencies of interest for analysis.

SUMMARY

In some embodiments described herein, improved time domain reconstruction methods are provided, from which a new waveform associated with motion depicted in a video can be reconstructed with particular focus on one or more frequencies or frequency ranges of interest and based upon a higher number of samples per cycle. This noticeably improves the visual quality of the filtered motion in the video. Additionally, reconstructed time waveforms with only the specific frequencies or frequency ranges of interest greatly reduces noise and improves the quality of the video. This supports larger amplification factors and minimizes the grainy visual effect that results when unwanted noise is amplified. Accordingly, waveform reconstruction methods provided herein are able to be made more efficient computationally than frequency domain techniques when only a few frequencies are being displayed in the reconstructed waveform.

BRIEF DESCRIPTION OF FIGURES

The figures accompanying and forming part of this specification are included to depict certain aspects of the embodiments described herein. A clearer understanding of the embodiments, and of methods and systems provided herein, will become more readily apparent by referring to the exemplary, and therefore non-limiting, aspects illustrated and shown in the drawing figures. The original test waveforms shown in FIGS. 1 and 2 are for comparison only and were constructed using LabView routines to add two sine waves of different frequencies and calculate the frequency spectrum. The test waveforms for all other figures were measured from a laboratory test rotor assembly.

MULTIPLE EMBODIMENTS AND ALTERNATIVES

Figure 1A:
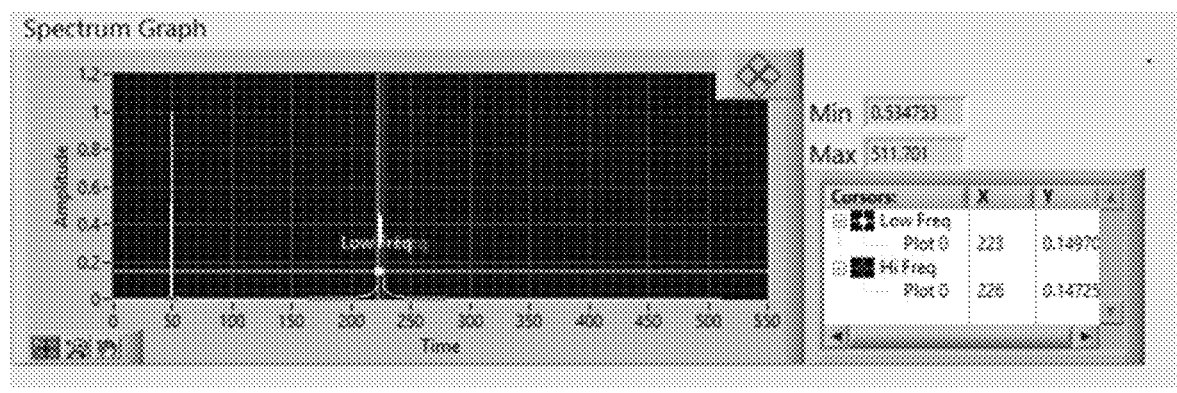
FIG. 1A is the frequency spectrum of a signal composed from two sine waves at 50 Hz and 225 Hz and FIG. 1B is a time waveform created using frequency-based filtering methods to isolate the frequency of interest at 50 Hz using LabView, which illustrates the typical distortion at the beginning and end of the data.
Figure 1B:
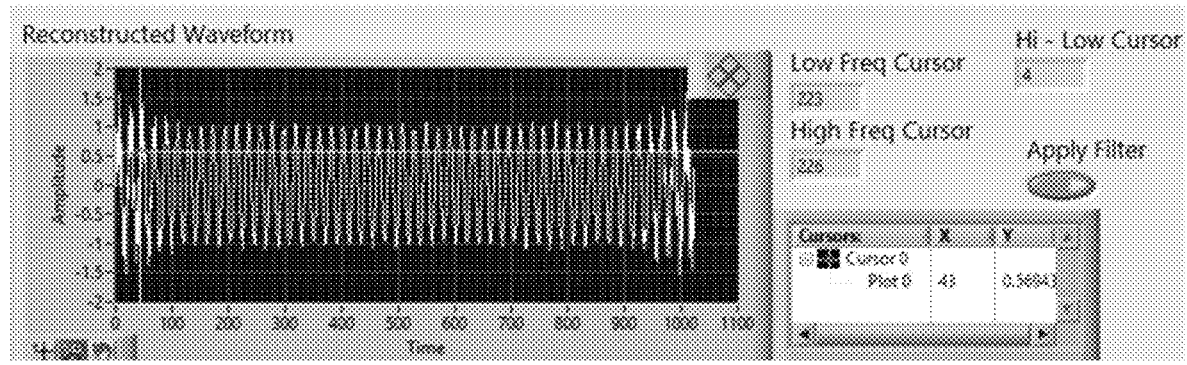
Figure 2A:
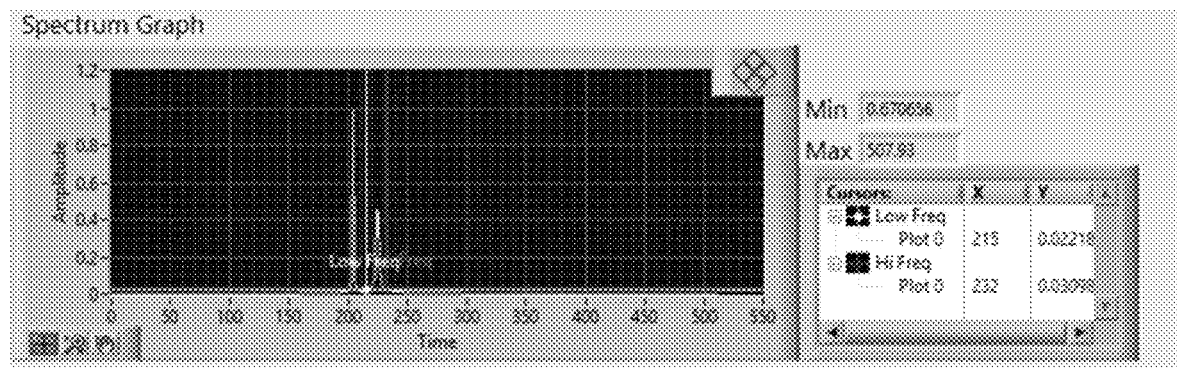
FIG. 2A is the frequency spectrum of a signal composed from two sine waves at 205 Hz and 225 Hz and FIG. 2B is a time waveform created using frequency-based filtering methods to isolate a single frequency of interest at 205 Hz using LabView, which illustrates the pervasive distortion throughout the data.
Figure 2B:
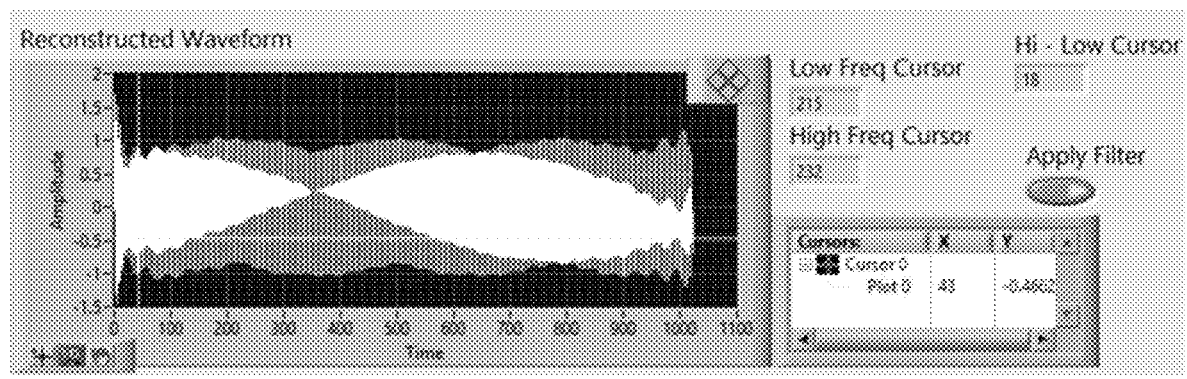

The reconstruction of a time waveform using inverse frequency domain transforms such as FFT convolution or simply windowing and applying the inverse FFT produces artifacts in the resulting time waveform data. This is illustrated using LabView program where a waveform is constructed from adding two sine waves of different frequencies and calculating the frequency spectrum shown in FIG. 1A. As expected, there are two peaks in this spectrum located at the respective frequencies, 50 Hz and 225 Hz, of the original sine wave components. If this data is filtered by removing the frequency peaks at 225 Hz, and the waveform is reconstructed using an inverse FFT or FFT convolution, then the desired result is a single sine wave at 50 Hz. However, the process of reconstruction produces distortion artifacts at the beginning and end of the waveform as illustrated in FIG. 1B. A second case shown in FIGS. 2A and 2B uses a synthesized waveform formed by adding sine waves at 205 Hz and 225 Hz. When the frequency peak at 225 Hz is removed from the spectrum, the waveform constructed using the inverse FFT or FFT convolution produces a distorted waveform with both artifacts at the beginning and end of the waveform but also modulation of the sine wave amplitude throughout the entire data set. The desired result from the reconstructed waveform in both cases is a sine wave of constant amplitude at the single remaining frequency after the removal of the 225 Hz peak.

A second approach using time domain techniques to reconstruct the waveform would be to create a summation of sine waves from the amplitude, frequency, and phase of every frequency point in the spectrum. This approach is very inefficient computationally, thus limiting its use. A variation of this approach is computationally practical if only the larger peaks present in the spectrum are utilized to reconstruct the waveform. Often, the user is interested in isolating only one frequency at a time so that he can visualize the effect of that single frequency. In some instances, a user could have a priori knowledge of the frequencies which he wants to investigate. However, it is more common that the user creates a composite frequency spectrum or table as described in the provisional patent application 63/043,299, "Enhanced Analysis Techniques Using Composite Frequency Spectrum Data," filed Jun. 24, 2020, the contents of which are fully incorporated herein by reference. Alternately, the user may select a region of interest, ROI, from a single frame of the video and the software will produce time waveform and frequency spectrum plots of the X-axis and Y-axis motion in the ROI. It is understood that multiple methods are well known in the art for interrogating a video to measure motion. Most often, the user will select a single frequency to filter. At other times, the user may select more than one frequency such as a fundamental frequency and one or more associated harmonic frequencies to visualize. The selection of the frequencies to be filtered and whether the frequencies are displayed in a single video or in sequential videos with only a single frequency present is under the control of the user.

In one aspect, the frequency, amplitude, and phase are determined for each pixel based upon changes in light intensity at each pixel over time. This can be accomplished for example by applying a Fourier Transform on each pixel with the individual intensity value of the pixel from each video frame comprising the time domain signal. For a given frequency, an amplitude and phase can be determined. The time waveform of a pure sine wave can be constructed from this data without the need to perform an inverse FFT. The elimination of this step could reduce processing time both computationally and alleviate requirements to move data or allocate memory for this step. This reconstructed waveform can replace the time domain data in the original images. A DC value for each Fourier Transform may be used for the offset or values from an individual frame. The reconstructed waveform at each pixel is applied to a reference frame to produce a modified video recording. As persons of ordinary skill in the art will appreciate, other transforms rather than the Fourier Transform functions could be used whose basis functions are not sine waves. In some cases, these alternate transforms may be advantageous depending on the dynamics of the motion present in the data. Other functions could be used instead of pure sine waves. For example, square waves or sawtooth waves could be used. For example, in some cases a pixel may undergo nearly on/off modulation. If a black and white region of an image moves completely past a pixel the result would be a transition of nearly black to white more approximating a square wave with the duty cycle depend on the time it spends imaging the black or white portion of the region being imaged. In other cases, the vibration may not be purely sinusoidal with the modulation in intensity due to the motion of the imaged area changing from white to black faster than when it modulates from black to white or vice versa. An evaluation of the motion data such as analysis of the spectrum could be used to indicated which waveform is appropriate for each pixel. A non-limiting example would be to correlate the measured time waveform at each pixel with a series of templates such as a square wave, triangular wave, sinusoidal wave, or other pattern. The template that correlates the highest with the measured waveform could be used. Other factors such as areas that undergo saturation in the image could be deemed to be best used with a flat top wave to account for the saturation.

As a non-limiting description, a waveform fabrication method employed according to multiple embodiments is as follows:

1. The user identifies one or more frequency peaks to be filtered from a frequency spectrum of a table of the N largest peaks located in the frequency spectrum from a region of interest or composite spectral data.

2. Locate a more precise value of the nominal amplitude and frequency values determined by the FFT algorithm for the set of peaks identified by the user by using interpolation, fitting techniques, or location algorithms based on the spectral windowing function applied to the sampled data before the FFT is performed.

3. Locate more precise phase values for the identified peaks in the set by adjusting the phase calculated, PC, from the real and imaginary values of the FFT algorithm for the frequency line closest to the exact frequency, using the formulas, {1} and {2}, below:

$$X=(FE-FL)/FR \quad \{1\}$$

where X should range from −0.5 to +0.5 and
FE=Exact Frequency
FL=Frequency of nearest frequency line in spectrum
FR=Frequency Resolution of spectrum $$\text{The Accurate Phase(in radians)}, PA=(PC-180*X+90)/57.2958 \quad \{2\}$$

4. The new waveform, TWF, is calculated for the user-identified peaks, using the formula, {3}, below:

$$TWF(n)=\Sigma A(i)*\sin(2\pi F*T(n)+PA) \quad \{3\}$$

where
A=Accurate amplitude of peak i
F=Accurate frequency of peak i
PA=Accurate phase of peak i, and
T(n) varies from 0 to the original total data collection time or a user selected time period 5. The number of time steps, n=1 to S, in the fabricated waveform can be equal to the number of data samples/frames originally collected, $$T(n)=n*\text{Delta-Time where } n \text{ varies from } 0,1,2 \ldots S$$

S=Duration*Sampling-Rate−1 and Delta-Time=1/Sampling Rate

Alternately, it can be increased such that there are more samples per cycles in the new waveform by selecting a number that is a multiple of S.

$$\text{Delta-Time=Duration}/(k*S)$$

$$T(n)=n*\text{Delta-Time where } n \text{ varies from } 0,1,2 \ldots (k*S)$$

This is particularly valuable when visualizing higher frequency motion to present smooth transitions of the repetitive motion rather than only a few samples per cycle.

Figure 3A:
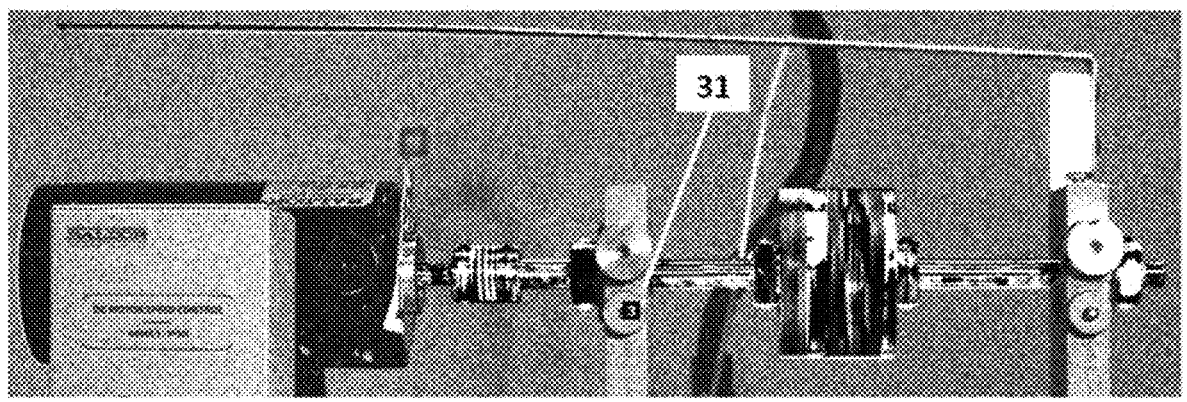
FIG. 3A depicts original visual data of the rotor test assembly as captured by the camera, with an amplification factor of 75× applied, and the grainy nature is evident in the single frame of the video when the novel embodiments described herein are not used.
Figure 3B:
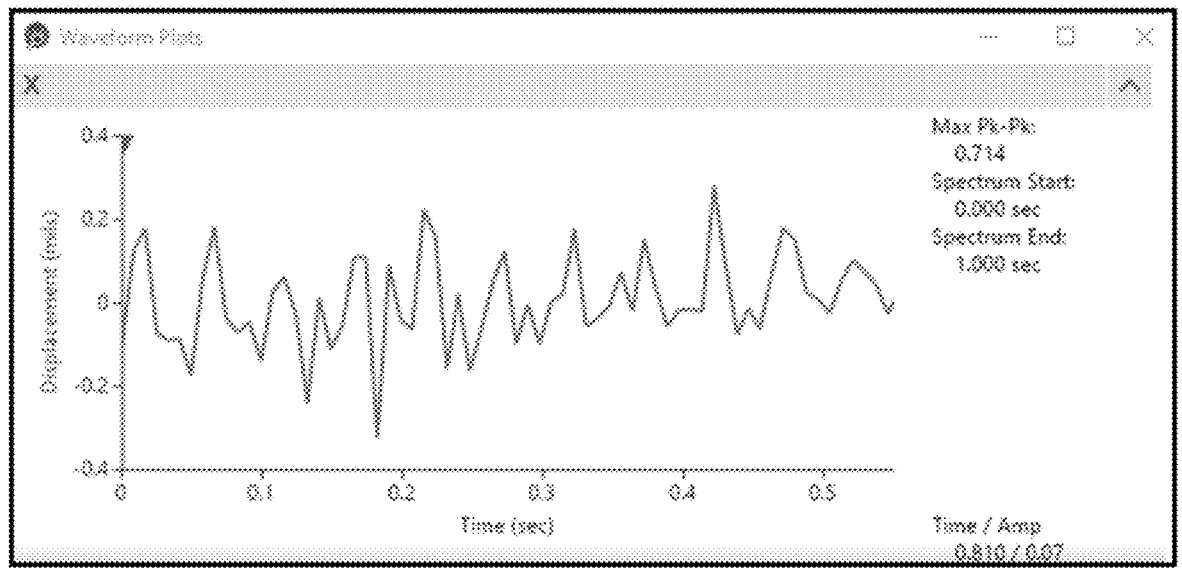
FIG. 3B is the waveform of the X-axis motion at the region of interest identified by label 31 in FIG. 3A.
Figure 3C:
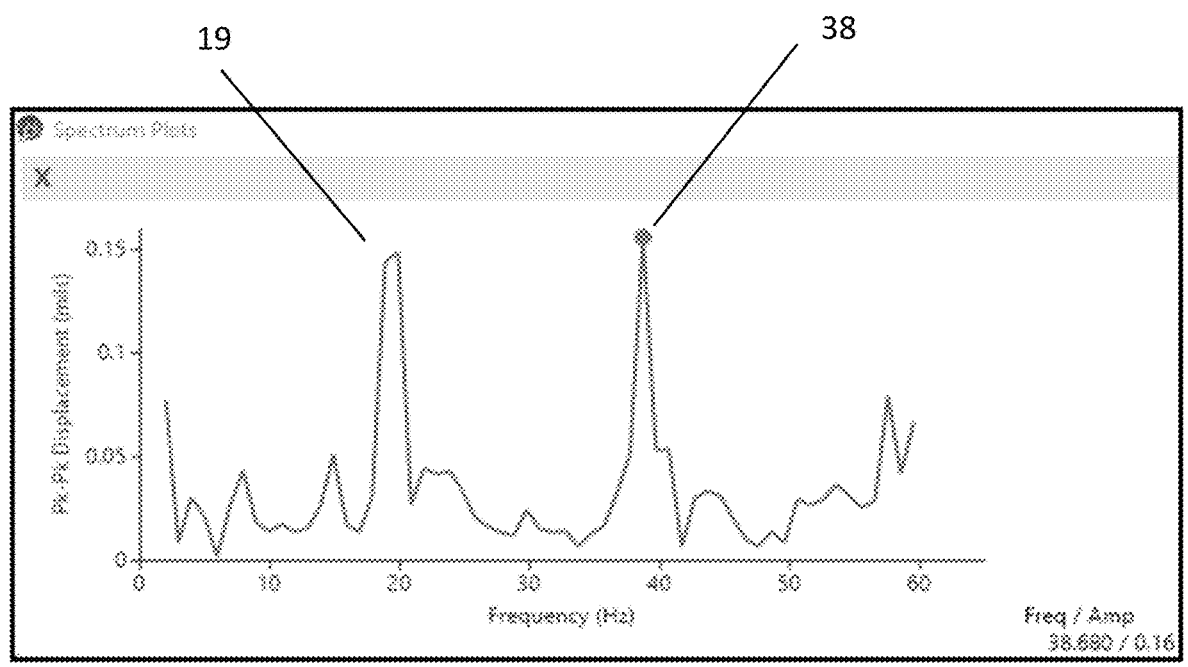
FIG. 3C shows the frequency spectrum of the X-axis motion at the region of interest identified by label 31 in FIG. 3A with dominant peaks at 1× and 2× rotational speed, 19.33 Hz and 38.68 Hz, respectively.
Figure 6A:
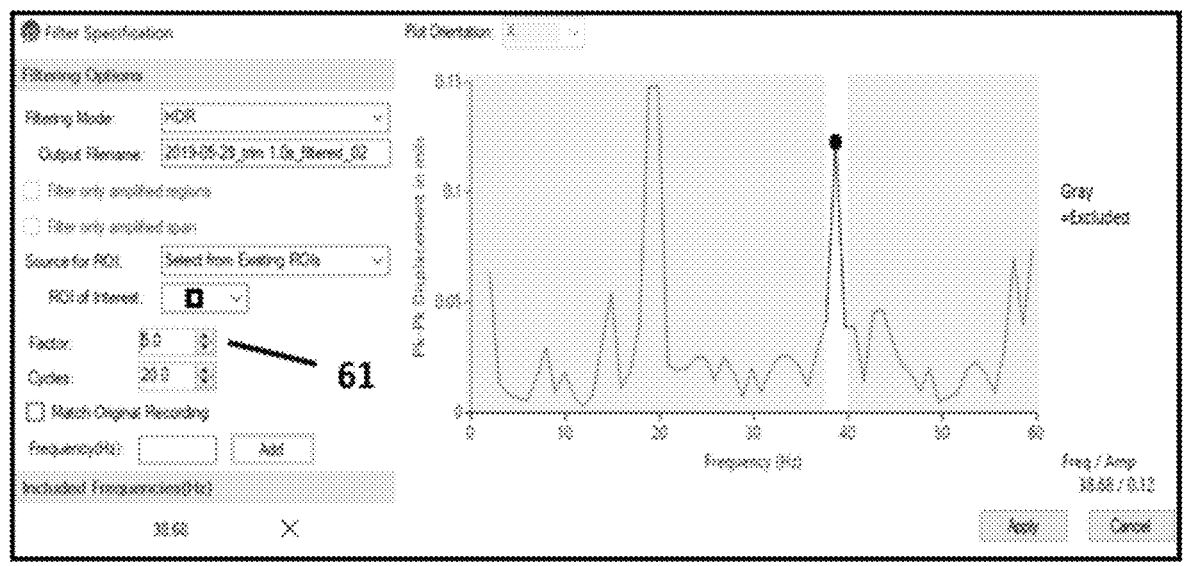
FIG. 6A illustrates a graphical user interface that has been setup to remove all frequencies except 38.68 Hz using the HDR filtering mode with enhanced resolution over the original recording as indicated by the Factor equal to 5.0 as shown by label 61, as illustrated on the frequency spectrum in this figure by graying out the excluded frequency ranges.
Figure 6B:
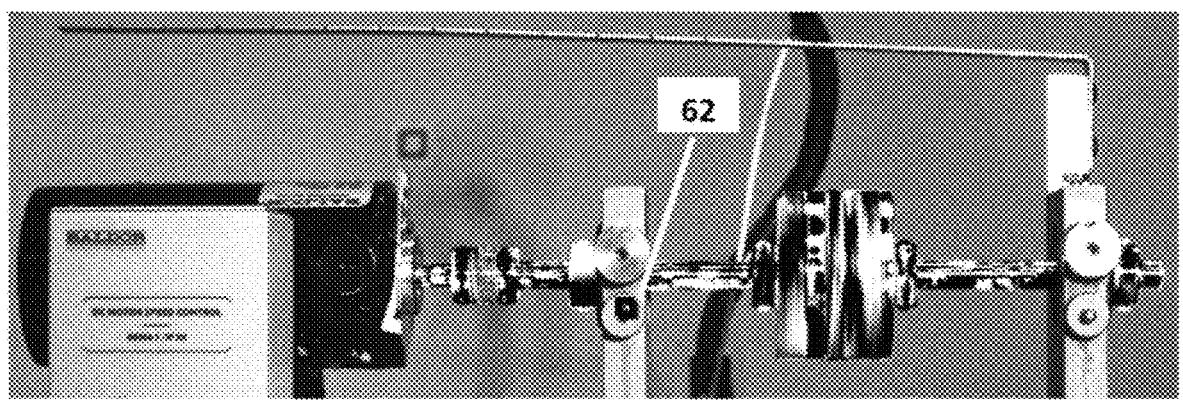
FIG. 6B is one frame of the filtered video identifying the ROI, labeled as 62, where the motion is measured and shows that much of the noise has been removed as reflected in the reduced grainy appearance as compared to FIG. 3A.
Figure 6C:
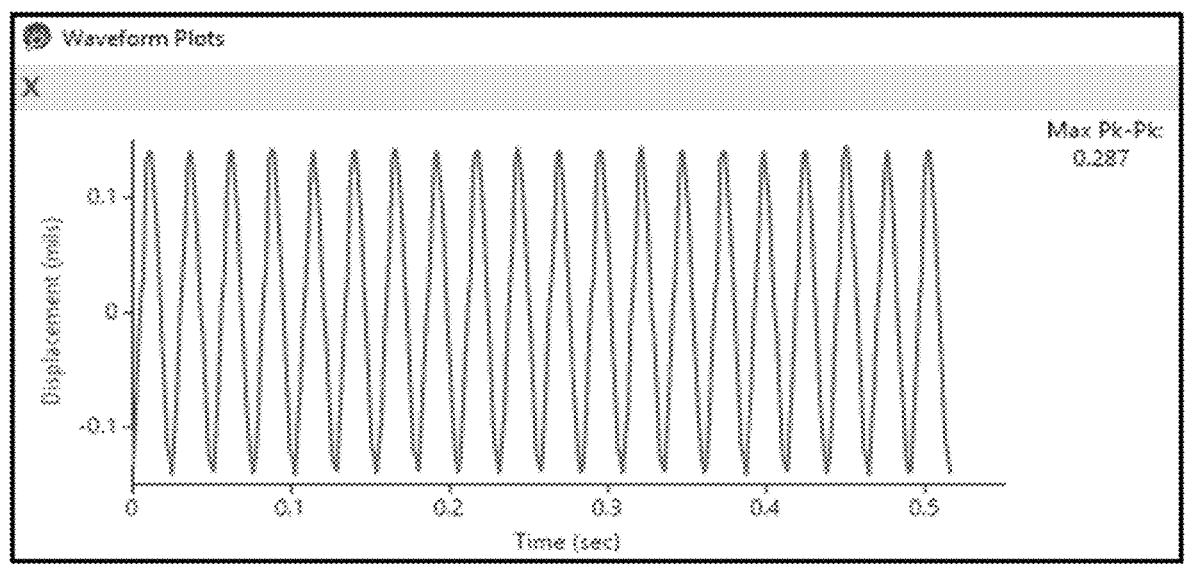
FIG. 6C is the waveform of the X-axis motion at the region of interest identified by label 62 in FIG. 6B and using 5 times the original resolution to reconstruct the video and waveform.

Beginning with FIG. 3A and progressing through FIG. 6C, data collected from a rotor test assembly provides a good visual example of the difference between the frequency domain and time domain reconstruction techniques. FIG. 3A is comparative in nature and shows one frame of the video collected from rotor test assembly reprocessed with a factor of 75 applied to amplify the motion of the assembly. There is no filtering applied to this video and the grainy nature of the image is due to the amplification of the random noise in the video signal. The waveform and frequency spectrum of the X-axis motion at the region of interest shown on the image as a red rectangle and labeled 31 is presented in FIG. 3B. The frequency spectrum has dominant peaks at 1× and 2× rotational speed, 19.33 Hz and 38.68 Hz (and labeled in the figure as peaks 19 and 38), respectively.

Figure 4A:
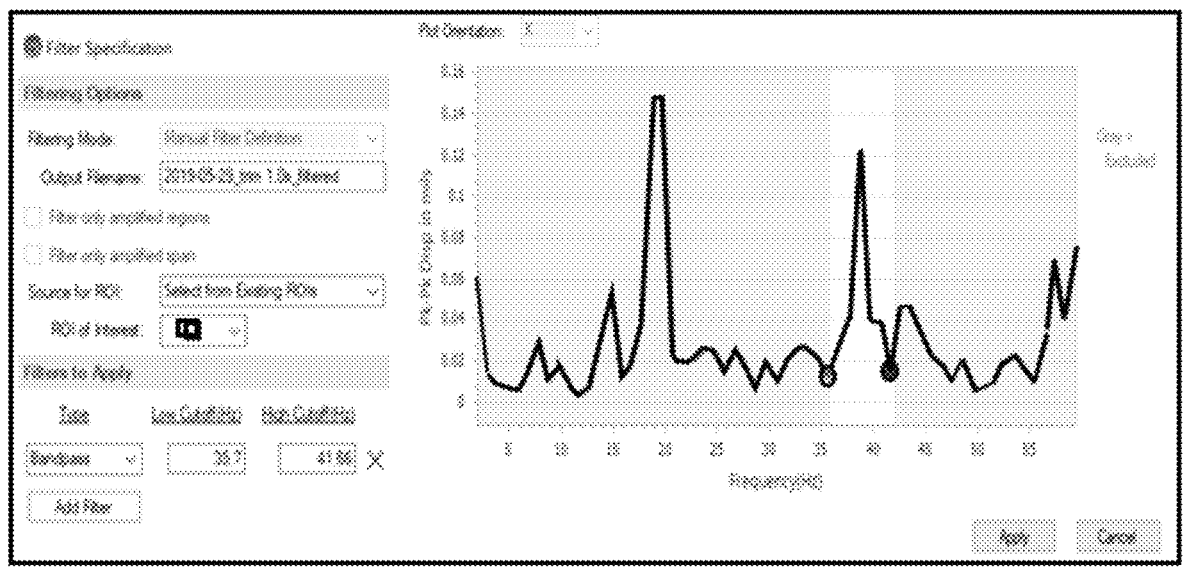
FIG. 4A illustrates a graphical user interface that has been setup to perform a bandpass filter operation and remove all frequencies except 38.68 Hz using frequency domain filtering techniques as illustrated on the spectrum by graying out the excluded frequency ranges.
Figure 4B:
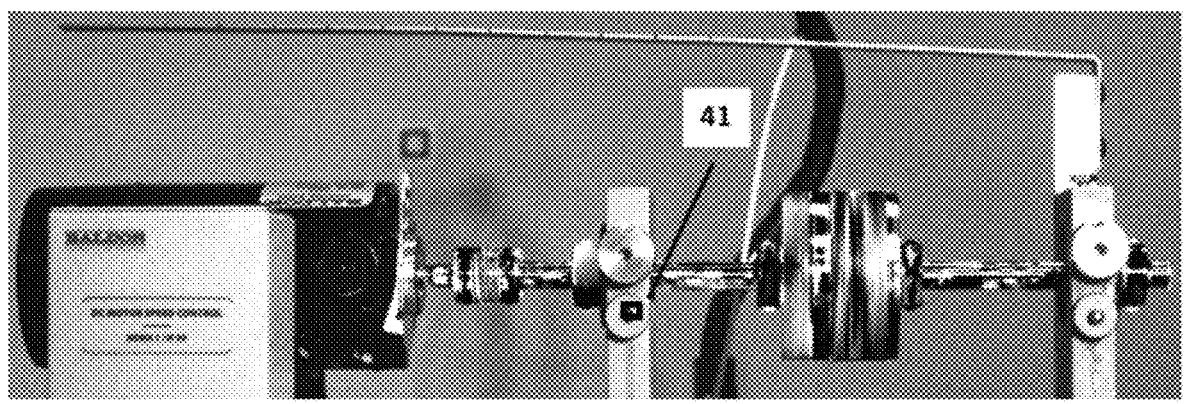
FIG. 4B is one frame of the filtered video identifying the ROI, labeled 41, where the motion is being measured and shows that much of the noise has been removed as reflected in the reduced grainy appearance as compared to FIG. 3A.
Figure 4C:
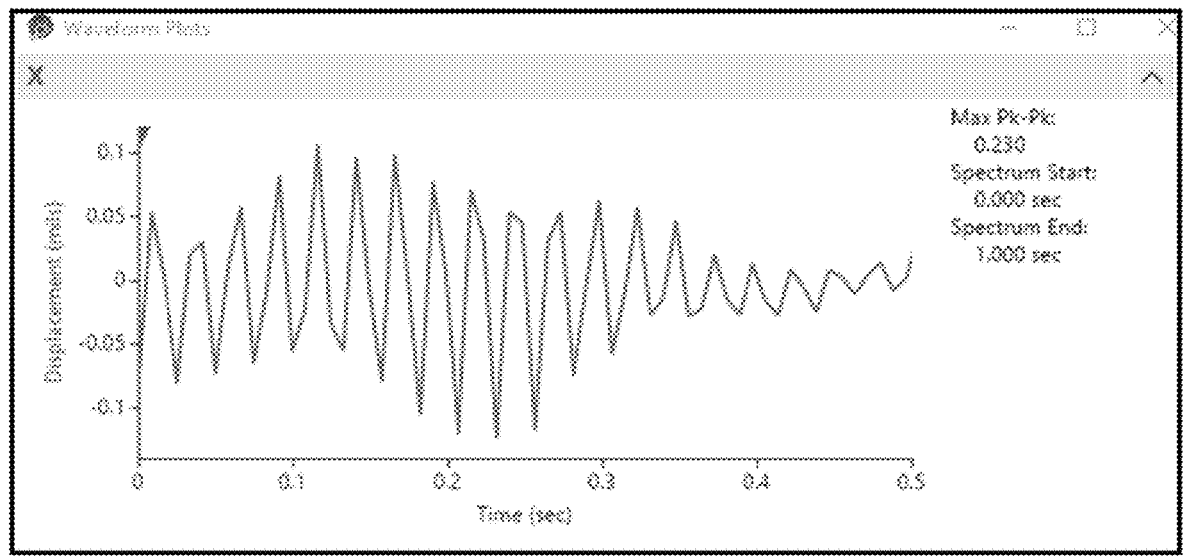
FIGS. 4C and 4D show the waveform and frequency spectrum, respectively, of the X-axis motion at the ROI identified by label 41 after removing all frequencies except 38.68 Hz using frequency domain filtering techniques.
Figure 4D:
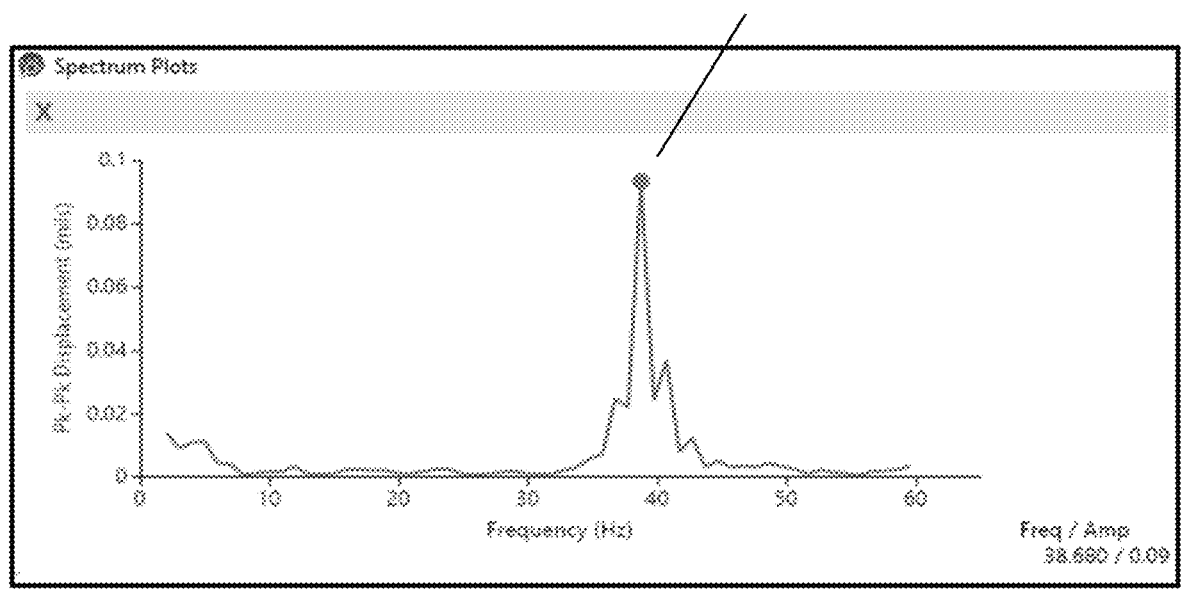

FIG. 4A shows a setup screen used to apply a bandpass filter to the video at 38.68 Hz using frequency domain techniques. FIG. 4B is one frame of the filtered video and shows that much of the noise has been removed as reflected in the reduced grainy appearance as compared to FIG. 3A. FIGS. 4C and 4D show the waveform and frequency spectrum, respectively, of the X-axis motion at the region of interest identified by label 41 after removing all frequencies except peak 38 (38.68 Hz) using frequency domain filtering techniques. Although the frequency spectrum does demonstrate that the other frequencies in the spectrum have been removed, the waveform shows a considerable amount of variation in the amplitude of the remaining sine wave at 38.68 Hz. The time domain waveform reconstruction filtering method, denoted as the "HDR method" in the software is the option selected in the field for "Filtering Mode" in FIGS. 5A and 6A, was applied to this same video of the rotor test assembly.

Figure 5A:
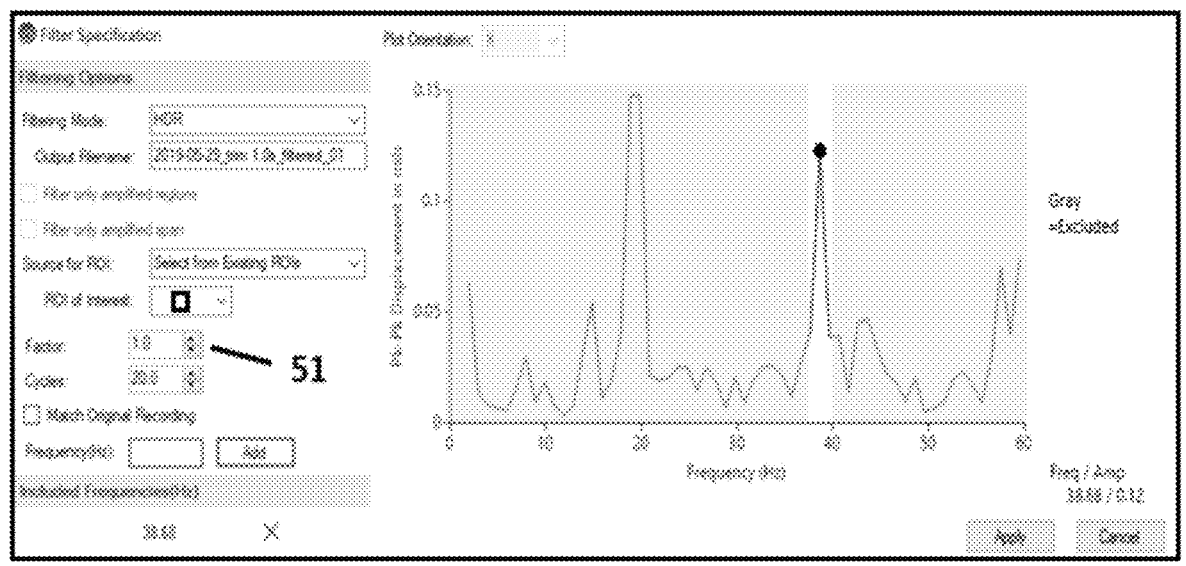
FIG. 5A illustrates a graphical user interface that has been setup to remove all frequencies except 38.68 Hz using the HDR filtering mode with the same resolution as the original recording as indicated by the Factor equal to 1.0 as shown by label 51, as illustrated on the frequency spectrum in this figure by graying out the excluded frequency ranges.
Figure 5B:
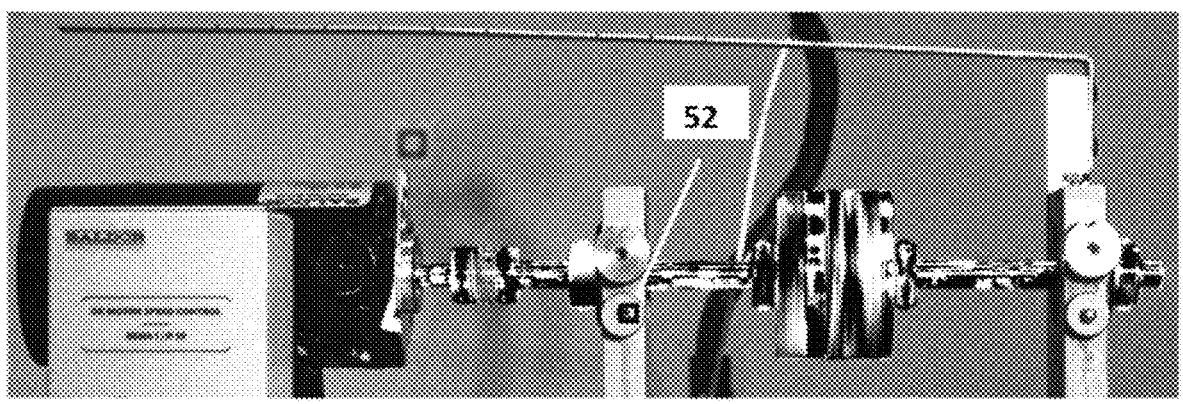
FIG. 5B is one frame of the filtered video identifying the ROI, labeled as 52, where the motion is measured and shows that much of the noise has been removed as reflected in the reduced grainy appearance as compared to FIG. 3A.
Figure 5C:
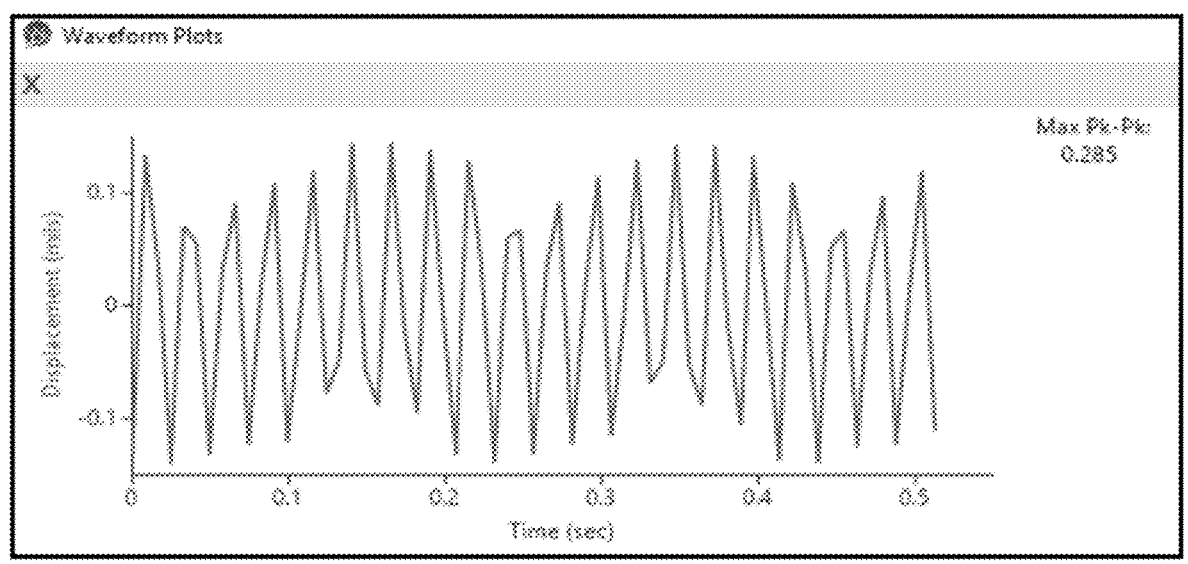
FIG. 5C is the waveform of the X-axis motion at the region of interest identified by label 52 in FIG. 5B.

More specifically, FIG. 5A shows a setup for the filter operation to remove all frequencies except 38.68 Hz using the HDR filtering mode with the same resolution as the original recording as indicated by the Factor equal to 1.0 as shown by label 51. FIG. 5B is one frame of the filtered video and shows that much of the noise has been removed as reflected in the reduced grainy appearance as compared to FIG. 3A. FIG. 5C shows the waveform of the X-axis motion at the region of interest identified by label 52 in FIG. 5B after removing all frequencies except 38.68 Hz using time domain HDR mode filtering techniques. The waveform reconstructed using the time domain fabrication method with the same resolution as the original data and shows no undesirable signal processing distortion, but the time waveform still exhibits some variation in the amplitude of the 38.68 Hz sine wave due to the limited number of samples available for each cycle. This is an improvement over the waveform in 4C. To reproduce the sine wave with very little apparent variation in amplitude the waveform needs to be reconstructed with a higher number of samples per cycle of the 38.68 Hz sine wave.

Continuing further, FIG. 6A is the setup for the filter operation to remove all frequencies except 38.68 Hz using the HDR filtering mode with 5 times the original resolution of the original recording as indicated by the Factor equal to 5.0 as shown by label 61. FIG. 6B is one frame of the filtered video and shows that much of the noise has been removed as reflected in the reduced grainy appearance as compared to FIG. 3A. FIG. 6C shows the waveform of the X-axis motion at the region of interest identified by label 62 in FIG. 6B after removing all frequencies except 38.68 Hz using time domain HDR mode filtering techniques and using 5 times the original resolution to construct the video and waveform.

Accordingly, aspects of the present embodiments as described herein include removal of noise and increasing the samples per cycle to enhance resolution. The reconstructed waveform from a single frequency is a pure sine wave. When this approach is applied to create a waveform of the intensity changes at each pixel in the scene of the video and the changes in the waveform are applied to a reference frame, then the modified video of the frequency-specific motion in the scene is not distorted by the fabrication process and significantly reduces the noise in the video. This allows larger values of amplification to be applied without degrading the video due to noise saturation. The reconstruction process removes the noise from all pixels at all frequencies where a peak was not present in the frequency spectrum of that pixel. This substantially improves the clarity of the resulting video.

FIGS. 5C and 6C compare two waveforms reconstructed using the time domain fabrication method for a higher frequency peak at 38.68 Hz sampled at 121 samples per second shown first with the same number of samples as the original data set in the source video and then with 5 times the number of samples as the original data illustrating the improved ability to visualize the motion. The original data sampled at 121 Hz provides less than 4 sample per cycle of the 38.68 Hz frequency. This produces a very sparse, choppy view of this motion at this frequency. The waveform constructed with the resolution increased by a factor of 5 results in about 15 samples per cycle and provides an excellent visual presentation of this motion. FIGS. 5B and 6B presents a single frame of the video reconstructed using a time domain fabrication method and an amplification factor of 75 showing the improved visual quality of the video. The same video has much greater clarity as a result of the noise reduction inherent in this method of reconstruction. Of course, the impact is best seen when viewing the video, but a single frame still illustrates the improved clarity. The removal of noise allows higher amplification factors to be applied to the video with much lower levels of noise contamination.

This technique can be applied by a user who is selecting one or more frequencies or frequency ranges for study individually or in combination. Accordingly, in some embodiments, a system to evaluate moving objects employs a computer program in a processor to: construct a representation of the plurality of frequencies at a selected location in the source video whose displacements exceeds a selected threshold; provide a graphical user interface to enable a user to select one or more of the plurality of frequencies to be included in a plurality of reconstructed waveforms; generate a reconstructed waveform at each pixel using a time domain fabrication method constructed from a summation of sine waves from the amplitude, frequency, and phase of the selected frequencies, wherein the number of samples is equal to or greater than the number of samples for the source video; and apply the reconstructed waveform at each pixel to a reference frame to produce a modified video recording. In some embodiments, the computer program further operates in said processor to amplify motion of at least one of the moving objects as displayed in the modified video recording. An example of processing methods to generate modified video images to amplify motion and enhance the visual depictions from a source video is found in US Pub. No. 2016/0300341 titled "Apparatus and Method for Visualizing Periodic Motions in Mechanical Components" (Hay, Jeffrey R. et al.; published Oct. 13, 2016), now patented as U.S. Pat. No. 10,062,411, the contents of which are fully incorporated by reference herein.

Additionally, the software could automatically step through a subset of the largest peaks and create a filtered video for each frequency. The subset of frequencies could be a number, K, of largest peaks in the frequency spectrum which are either selected or determined based on exceeding a threshold, or a user-selected subset from a table of the largest peaks present in the spectrum. Similarly, the software could identify families of harmonic or sideband peaks and process this plurality of peaks to create a video for each harmonic or sideband family. The methods for locating harmonic or sideband families of peaks in a spectrum is well known to those skilled in the art.

A variation of this method can be used to improve the quality of a differentiated video which presents the motion in the video in terms of velocity or acceleration rather the native displacement units. As appreciated by persons of ordinary skill in the art, a common method of differentiating motion data is to multiply the value of each line in the spectrum by a differentiation factor equal to $2\pi$ times the frequency value ($2\pi F$) to get velocity and by the square of $2\pi F$ to obtain acceleration. Thus, the velocity or acceleration video of the selected frequencies could be obtained by multiplying the amplitude of the sine wave by the appropriate differentiation factor using the more precise amplitude and frequency values of the selected peaks.

In some cases, the user might want to see the overall motion of the video in velocity or acceleration rather than just a few selected frequency peaks. Accordingly, in some embodiments, a time domain differentiation fabrication method is performed as follows:

1. Locate the largest N peaks in the frequency spectrum above the noise floor of the spectrum for one or more spatial locations in the video.

2. Determine the maximum peak amplitude in the set of located peaks and preferably, discard any peaks in the set that are a factor of K less than the maximum peak amplitude since the motion associated with very small peaks may result from noise. This results in a set of M remaining peaks.

3. Locate a more precise value of the amplitude and frequency value provided by the FFT algorithm for the set of M remaining peaks using interpolation, fitting techniques, or location algorithms based on the spectral windowing function applied to the sampled data before the FFT is performed.

4. Locate more precise phase values, PAO, for the remaining peaks in the set by adjusting the phase calculated by the FFT algorithm, PC, from the real and imaginary values of the spectrum for the frequency line closest to the exact frequency, using the formulas, {4} and {5}, below:

$$X=(FE-FL)/FR \quad \{4\}$$

where X should range from −0.5 to +0.5 and
FE=Exact Frequency
FL=Frequency of nearest frequency line in spectrum
FR=Frequency Resolution of spectrum $$\text{The Accurate Phase in radians,} PAO=(PC-180*X+90)/57.2958 \quad \{5\}$$

5. Shift the phase by a phase differentiation factor, PIF, which is 90 degrees (1.57 radians) for conversion to velocity and 180 degrees (3.14 radians) for conversion to acceleration, $$PA=PAO+PIF$$

6. The new waveform, TWF, is calculated by formula {6} using an amplitude differentiation factor, D, for the M remaining peaks in the set of located peaks $$TWF(n)=\Sigma D*A(i)*\sin(2\pi F*T(n)+PA) \quad \{6\}$$

where
D=$2\pi F$ for velocity or ($2\pi F$) squared for acceleration
A=Accurate amplitude of peak i
F=Accurate frequency of peak i
PA=Accurate phase of peak i, and
T(n) varies from 0 to the original total data collection time or a user selected time period The number of time steps, n=1 to S, in the fabricated waveform can be equal to the number of data samples/frames originally collected, $$T(n)=n*\text{Delta-Time where } n \text{ varies from } 0,1,2 \ldots S$$

S=Duration*Sampling-Rate−1 and Delta-Time=1/Sampling Rate

Alternately, it can be increased such that there are more samples per cycles in the new waveform by selecting a number that is a multiple of S.

$$\text{Delta-Time=Duration}/(k*S)$$

$$T(n)=n*\text{Delta-Time where } n \text{ varies from } 0,1,2 \ldots (k*S)$$

This is particularly valuable when visualizing higher frequency motion to present smooth transitions of the repetitive motion rather than on a few samples per cycle.

Although the exemplary method described above addresses differentiating a displacement waveform to obtain a velocity or acceleration waveform, this technique could also be applied in the reverse sense to integrate an acceleration waveform to obtain a velocity or displacement waveform. In this case, the waveform is multiplied by the amplitude integration factor, 1/D:

$$TWF(n)=\Sigma 1/D*A(i)*\sin(2\pi F*T(n)+PA)$$

Also, the integration phase shift, PIF, is subtracted from the calculated phase rather than added:

$$PA=PAO-PIF$$

Accordingly, in some embodiments, a system to evaluate moving objects employs a computer program in a processor to: calculate a frequency spectrum at one or more spatial locations in the source video to identify the plurality of frequencies present in the video; locate the N largest peaks among the plurality of frequencies above the noise floor of the one or more frequency spectra; discard one or more frequency peaks among the plurality of frequencies that are at or below a factor of K less than the maximum peak, resulting in a set of M remaining frequency peaks to be included in a reconstructed waveform for each pixel; generate a reconstructed waveform at each pixel using a time domain differentiation fabrication method constructed from a summation of sine waves using a modified amplitude and phase of each remaining frequency wherein the amplitude and phase are modified by a differentiation factor and wherein the number of samples is equal to or greater than the number of samples for the source video; and apply the reconstructed waveform at each pixel to a reference frame to produce a modified video recording.

Multiple embodiments and alternatives disclosed herein may be recited or practiced as methods, or as part of a system for evaluating a collection of moving objects undergoing periodic motion and depicted in a video recording. In some embodiments, a new waveform is constructed which is specific to a selected frequency or frequencies. A reconstructed video with less noise can be created by applying such new waveform to a reference frame obtained from the video recording. Various alternative approaches are provided for fabricating the new waveform, which involve manipulation of amplitude, frequency, and phase characteristics of the motion in question. In some embodiments, results are improved, and resolution is enhanced by increasing the number of data samples per cycle. In view of the embodiments described herein, filtering techniques may be limited to specific objects, object types or other limiting subject matter. Image segmentation may be used to narrow a region of interest or pixels where this technique will be applied. It will be appreciated that image segmentation is a well-known and established technique, which is familiar to persons of ordinary skill in this field. The user may employ image segmentation by selecting an area in the image and the segmentation process includes all areas associated with that segment. For example, the user may click on a pipe and the image segmentation process identifies all areas in the image associated with or a part of that pipe for inclusion. Object recognition may be another way in which the areas are define where this waveform fabrication technique is applied to a subset of pixels. It will be appreciated that object recognition methods are well-known and established techniques known to persons of ordinary skill in this field. For example, deep learning models such as convolutional neural networks are used to automatically learn an object's inherent features in order to identify that object. Other machine learning methods are based on techniques such as HOG feature extraction using an SVM learning model, a Bag-of-words model with features such as SURF and MSER, and the Viola-Jones algorithm. More basic object recognition methods are based on template matching or image segmentation and blob analysis.

The user may wish to look at only the motor or pump or both. Object recognition may be employed to identify the pixels associated with the motor. The object recognition may identify the object, and the pixels associated with the object and only include that object. Object recognition may also be used to identify an object type, for example, pipes so that all pipes in the scene are included.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. In terms of the descriptions, it will be understood by those having ordinary skill in the art that modifications and variations of these embodiments are reasonably possible in light of the above teachings and descriptions.

What is claimed is:

1. A system for evaluating a collection of moving objects undergoing periodic motion using at least one video acquisition device that acquires samples in the form of sampling data as a plurality of video images of a field of view of the moving objects, wherein the video images are divisible into individual video image frames, with each frame being divisible into a plurality of pixels, comprising:
    a video acquisition device to obtain a source video of the moving objects, wherein video images are acquired at a sampling rate that is sufficient to capture periodic motion at a plurality of frequencies occurring in one or more of the moving objects;
    a processor and a memory for storage of the source video including individual video frames; and
    a computer program operating in said processor to:
        construct at least one of a frequency spectrum plot or table of at least a subset of the plurality of frequencies of periodic motion in the source video or a composite frequency spectrum plot or table of the plurality of frequencies at a selected location in the source video;
        produce a reconstructed waveform using a time domain fabrication method for one or more pixels in a subset of pixels in the field of view or a region of the field of view, and
        apply the reconstructed waveform for the subset of pixels or region to a reference frame to produce a modified video recording.

2. The system of claim 1, wherein the time domain fabrication method uses values of amplitude, frequency, and phase for peaks associated with one or more frequencies or frequency ranges of interest which are more accurate compared to nominal values provided by the frequency spectrum.

3. The system of claim 1, wherein the modified video recording is amplified.

4. The system of claim 1, wherein the one or more pixels are associated with one or more frequencies of periodic motion in the field of view, and the frequencies of periodic motion included in the modified video recording are selected by a user via a graphical user interface.

5. The system of claim 4, wherein the user selects one or more peaks via the graphical user interface to include in the modified video recording, wherein the one or more peaks are associated with one or more frequencies or frequency ranges of interest.

6. The system of claim 1, wherein the one or more pixels are associated with one or more frequencies of periodic motion in the field of view, and the computer program operates to automatically select the frequencies of periodic motion included in the modified video recording.

7. The system of claim 6, wherein the computer selects the frequencies of periodic motion based on exceeding or falling below a predetermined threshold.

8. The system of claim 7, wherein the predetermined threshold relates to amplitude or frequency.

9. A system for evaluating a collection of moving objects undergoing periodic motion using at least one video acquisition device that acquires samples in the form of sampling data as a plurality of video images of a field of view of the moving objects, wherein the video images are divisible into individual video image frames, with each frame being divisible into a plurality of pixels, comprising:
    a video acquisition device to obtain a source video of the moving objects, wherein video images are acquired at a sampling rate that is sufficient to capture periodic motion at a plurality of frequencies occurring in one or more of the moving objects;
    a processor and a memory for storage of the source video including individual video frames; and
    a computer program operating in said processor to:
        construct at least one of a frequency spectrum plot or table of at least a subset of the plurality of frequencies of periodic motion in the source video or a composite frequency spectrum plot or table of the plurality of frequencies at a selected location in the source video;
        locate a maximum peak and the largest N peaks in the frequency spectrum and discard one or more peaks that are a factor of K less than the maximum peak, resulting in a set of M remaining peaks;
        produce a reconstructed waveform using a time domain fabrication method for one or more pixels in a subset of pixels in the field of view or region of the field of view where periodic motion is associated with one of the M remaining peaks; and
        apply the reconstructed waveform for the subset of pixels or region to a reference frame to produce a modified video recording.

10. The system of claim 9, wherein the time domain fabrication method uses values of amplitude, frequency, and phase for peaks associated with one or more frequencies or frequency ranges of interest which are more accurate compared to nominal values provided by the frequency spectrum.

11. The system of claim 9, wherein the modified video recording is amplified.

12. The system of claim 9, wherein the computer program automatically steps through a subset of the largest N peaks and applies the reconstructed waveforms to produce individual videos for one or more frequencies in the subset of the largest N peaks.

* * * * *